(12) United States Patent
Lasch et al.

(10) Patent No.: US 7,398,931 B2
(45) Date of Patent: Jul. 15, 2008

(54) FOLDABLE TRANSACTION CARD

(75) Inventors: Ellen Lasch, New York, NY (US); Lisa Ann Morrill Webb, Darien, CT (US); Priscilla Gandel, Long Branch, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 11/714,625

(22) Filed: Mar. 6, 2007

(65) Prior Publication Data

US 2007/0158435 A1 Jul. 12, 2007

Related U.S. Application Data

(63) Continuation of application No. 10/436,394, filed on May 12, 2003, now Pat. No. 7,213,764.

(60) Provisional application No. 60/442,991, filed on Jan. 28, 2003, provisional application No. 60/424,592, filed on Nov. 7, 2002.

(51) Int. Cl.
*G06K 19/00* (2006.01)
(52) U.S. Cl. .................. 235/487; 235/486; 235/488; 235/492; D19/9
(58) Field of Classification Search .............. 235/486, 235/380, 449, 480, 487, 488, 489, 492, 493; D19/9
See application file for complete search history.

(56) References Cited

U.S. PATENT DOCUMENTS

| | | | |
|---|---|---|---|
| 2,767,756 A | 10/1956 | Niles | |
| 3,369,585 A | 2/1968 | Martinsen | |
| 3,446,260 A | 5/1969 | Osher | |
| 3,647,165 A | 3/1972 | Whitla | |
| 3,648,832 A | 3/1972 | Kirshenbaum et al. | |
| 3,929,177 A | 12/1975 | Reis | |
| 3,940,016 A | 2/1976 | Krakauer | |
| 4,056,139 A | 11/1977 | Murt | |
| 4,105,057 A | 8/1978 | Baumann et al. | |
| 4,356,646 A | 11/1982 | Johnson, Jr. | |
| D270,303 S | 8/1983 | Zautner | |
| 4,562,342 A | 12/1985 | Solo | |
| 4,581,523 A | 4/1986 | Okuno | |
| 4,697,363 A | 10/1987 | Gamm | |
| 4,717,908 A | 1/1988 | Phillips et al. | |
| 4,768,811 A | 9/1988 | Oshikoshi et al. | |
| 4,801,790 A | 1/1989 | Solo | |

(Continued)

FOREIGN PATENT DOCUMENTS

CA 2300241 9/2000

(Continued)

*Primary Examiner*—Seung H Lee
(74) *Attorney, Agent, or Firm*—Snell & Wilmer, L.L.P.

(57) ABSTRACT

A transaction card having one or more folds therein to provide a compact and easily stored transaction card is provided. Moreover, a foldable transaction card having one or more holes or apertures therein for holding a keychain, or other device for attaching the transaction card to another item, such as a set of keys, a wallet, or other item is provided. Other embodiments include spring-loaded clips on the foldable transaction cards and protective sleeves, housings or cases for full-sized and smaller-sized cards. In addition, methods of making foldable transaction cards are provided.

23 Claims, 9 Drawing Sheets

U.S. PATENT DOCUMENTS

| | | | |
|---|---|---|---|
| 4,849,617 A | 7/1989 | Ueda | |
| 4,851,610 A | 7/1989 | LeBlanc et al. | |
| 4,884,507 A | 12/1989 | Levy | |
| 4,897,533 A | 1/1990 | Lyszczarz | |
| 4,897,947 A | 2/1990 | Kass-Pious | |
| 4,917,292 A | 4/1990 | Drexler | |
| D307,979 S | 5/1990 | Purvis | |
| 4,937,963 A | 7/1990 | Barnes | |
| 4,957,311 A | 9/1990 | Geisenheimer | |
| 5,004,899 A * | 4/1991 | Ueda | 235/492 |
| 5,007,899 A | 4/1991 | Larsson | |
| 5,015,830 A | 5/1991 | Masuzawa et al. | |
| 5,171,039 A | 12/1992 | Dusek | |
| 5,189,894 A | 3/1993 | Buck | |
| 5,257,656 A | 11/1993 | McLeroy | |
| 5,279,019 A | 1/1994 | Knickle | |
| 5,308,121 A | 5/1994 | Gunn | |
| 5,311,679 A | 5/1994 | Birch, Sr. | |
| 5,461,219 A | 10/1995 | Cronvall et al. | |
| 5,478,629 A | 12/1995 | Norman | |
| 5,503,434 A | 4/1996 | Gunn et al. | |
| 5,506,395 A | 4/1996 | Eppley | |
| 5,520,230 A | 5/1996 | Sumner, III | |
| 5,541,985 A | 7/1996 | Ishii et al. | |
| 5,575,094 A | 11/1996 | Leake et al. | |
| 5,577,609 A | 11/1996 | Hexter | |
| 5,658,157 A | 8/1997 | Koiwa et al. | |
| 5,665,439 A | 9/1997 | Andersen et al. | |
| 5,700,037 A * | 12/1997 | Keller | 283/107 |
| 5,710,421 A | 1/1998 | Kokubu | |
| 5,725,098 A | 3/1998 | Seifert et al. | |
| 5,823,359 A | 10/1998 | Harris et al. | |
| 5,865,470 A | 2/1999 | Thompson | |
| 5,886,333 A | 3/1999 | Miyake | |
| 5,912,446 A | 6/1999 | Wong et al. | |
| 5,915,016 A | 6/1999 | Savalle et al. | |
| 5,924,624 A | 7/1999 | Martin | |
| 5,933,328 A | 8/1999 | Wallace et al. | |
| 5,938,010 A | 8/1999 | Osterbye | |
| 5,968,570 A | 10/1999 | Paulucci | |
| 5,973,475 A | 10/1999 | Combaluzier | |
| 5,979,942 A | 11/1999 | Ivicic | |
| 6,025,283 A | 2/2000 | Roberts | |
| 6,027,028 A | 2/2000 | Pieterse et al. | |
| 6,032,866 A | 3/2000 | Knighton et al. | |
| 6,082,422 A | 7/2000 | Kaminski | |
| D432,939 S | 10/2000 | Hooglander | |
| 6,128,604 A * | 10/2000 | Sakamaki et al. | 705/41 |
| 6,148,484 A | 11/2000 | Andreae, Jr. | |
| 6,171,138 B1 | 1/2001 | Lefebvre et al. | |
| 6,184,788 B1 | 2/2001 | Middlemiss et al. | |
| 6,223,977 B1 | 5/2001 | Hill | |
| 6,227,424 B1 | 5/2001 | Roegner | |
| 6,330,961 B1 | 12/2001 | Borja | |
| 6,375,081 B1 | 4/2002 | Hileman et al. | |
| 6,419,158 B2 * | 7/2002 | Hooglander | 235/492 |
| 6,460,696 B1 | 10/2002 | Meyer | |
| 6,471,127 B2 | 10/2002 | Pentz et al. | |
| 6,481,623 B1 | 11/2002 | Grant et al. | |
| 6,523,292 B2 | 2/2003 | Slavik | |
| D474,234 S * | 5/2003 | Nelms et al. | D19/9 |
| 6,601,622 B1 | 8/2003 | Young | |
| 6,644,551 B2 | 11/2003 | Clayman et al. | |
| 6,651,813 B2 | 11/2003 | Vallans et al. | |
| 6,651,892 B2 | 11/2003 | Hooglander | |
| 6,681,926 B2 | 1/2004 | DeVolpi | |
| 6,735,081 B1 | 5/2004 | Bishop et al. | |
| 6,751,805 B1 | 6/2004 | Austion | |
| 6,752,272 B2 | 6/2004 | Jones et al. | |
| 6,764,014 B2 | 7/2004 | Lasch et al. | |
| 6,766,952 B2 | 7/2004 | Luu | |
| 6,823,910 B1 | 11/2004 | Elnekaveh | |
| 6,824,066 B2 | 11/2004 | Weyant | |
| 6,842,336 B2 | 1/2005 | Schremmer et al. | |
| 6,843,422 B2 | 1/2005 | Jones et al. | |
| 6,845,863 B1 | 1/2005 | Riley | |
| 6,866,439 B2 | 3/2005 | Steinschaden | |
| 6,871,682 B2 | 3/2005 | Hogganvik | |
| 6,892,875 B2 | 5/2005 | DeVolpi | |
| 6,910,624 B1 | 6/2005 | Natsuno | |
| 6,978,940 B2 | 12/2005 | Luu | |
| 6,991,172 B2 | 1/2006 | Luu | |
| 7,023,692 B2 | 4/2006 | Mansutti et al. | |
| 7,048,216 B2 | 5/2006 | Hodson et al. | |
| 7,055,740 B1 | 6/2006 | Schultz | |
| 7,059,520 B1 | 6/2006 | Shtesi | |
| 7,070,095 B1 | 7/2006 | Gandel et al. | |
| 7,124,955 B2 | 10/2006 | Lasch et al. | |
| 7,130,648 B1 | 10/2006 | Fournier et al. | |
| 7,137,552 B1 | 11/2006 | Lasch et al. | |
| 7,147,151 B2 | 12/2006 | Lasch et al. | |
| 7,156,301 B1 | 1/2007 | Bonalle et al. | |
| 7,198,199 B2 | 4/2007 | Ho | |
| 7,213,764 B2 | 5/2007 | Lasch et al. | |
| 7,270,255 B2 | 9/2007 | Badillo et al. | |
| 7,278,584 B1 | 10/2007 | Gandel et al. | |
| 7,290,364 B2 | 11/2007 | Nelms et al. | |
| 7,336,973 B2 | 2/2008 | Goldthwaite et al. | |
| 7,340,540 B2 | 3/2008 | Miller et al. | |
| 7,347,360 B2 | 3/2008 | Lasch et al. | |
| 2002/0086079 A1 | 7/2002 | Meindl et al. | |
| 2002/0104811 A1 | 8/2002 | Young et al. | |
| 2002/0125164 A1 | 9/2002 | Bassinson | |
| 2002/0153410 A1 | 10/2002 | Santini | |
| 2002/0177407 A1 | 11/2002 | Mitsumoto | |
| 2003/0085288 A1 | 5/2003 | Luu | |
| 2003/0132132 A1 | 7/2003 | Small | |
| 2003/0153356 A1 | 8/2003 | Liu et al. | |
| 2003/0222153 A1 | 12/2003 | Pentz et al. | |
| 2004/0089724 A1 | 5/2004 | Lasch et al. | |
| 2004/0093689 A1 | 5/2004 | Sosa et al. | |
| 2004/0104268 A1 | 6/2004 | Bailey et al. | |
| 2004/0108032 A1 | 6/2004 | Lyons | |
| 2004/0126284 A1 | 7/2004 | Lily et al. | |
| 2004/0127256 A1 | 7/2004 | Goldthwaite et al. | |
| 2004/0256455 A1 | 12/2004 | Fukushima et al. | |
| 2005/0011776 A1 | 1/2005 | Nagel | |
| 2005/0025117 A1 | 2/2005 | Inagaki et al. | |
| 2005/0033994 A1 | 2/2005 | Suzuki | |
| 2005/0184166 A1 | 8/2005 | Pentz et al. | |
| 2005/0197169 A1 | 9/2005 | Son | |
| 2006/0105821 A1 | 5/2006 | Goradesky et al. | |
| 2006/0192723 A1 | 8/2006 | Harada et al. | |
| 2006/0206582 A1 | 9/2006 | Finn | |
| 2006/0208066 A1 | 9/2006 | Finn et al. | |
| 2006/0226217 A1 | 10/2006 | Narendra et al. | |
| 2006/0234778 A1 | 10/2006 | Matsushita et al. | |
| 2007/0057004 A1 | 3/2007 | Butler et al. | |
| 2007/0068978 A1 | 3/2007 | Jackson et al. | |
| 2007/0123190 A1 | 5/2007 | Enmei | |
| 2007/0232371 A1 | 10/2007 | Soekawa et al. | |

FOREIGN PATENT DOCUMENTS

| | | |
|---|---|---|
| DE | 19741726 | 9/1997 |
| EP | 0735505 | 10/1996 |
| GB | 2281714 | 3/1995 |
| JP | 361100436 | 5/1986 |
| WO | WO0073989 | 12/2000 |
| WO | WO0113320 | 2/2001 |
| WO | WO02067190 | 8/2002 |
| WO | WO2004052657 | 6/2004 |

* cited by examiner

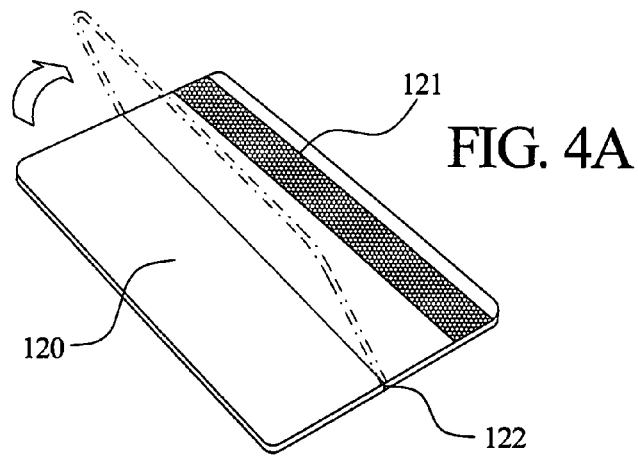
FIG. 4A
FIG. 4B
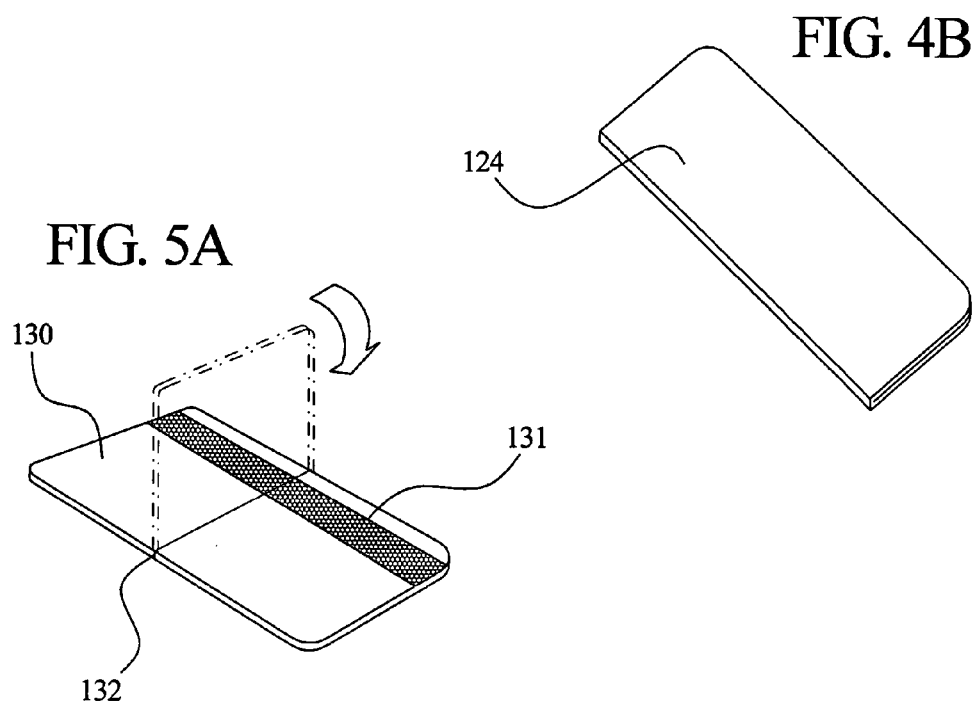
FIG. 5A
FIG. 5B
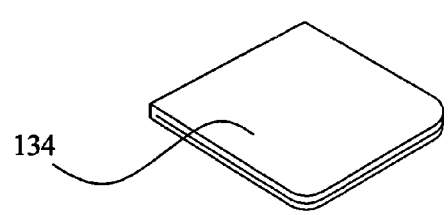

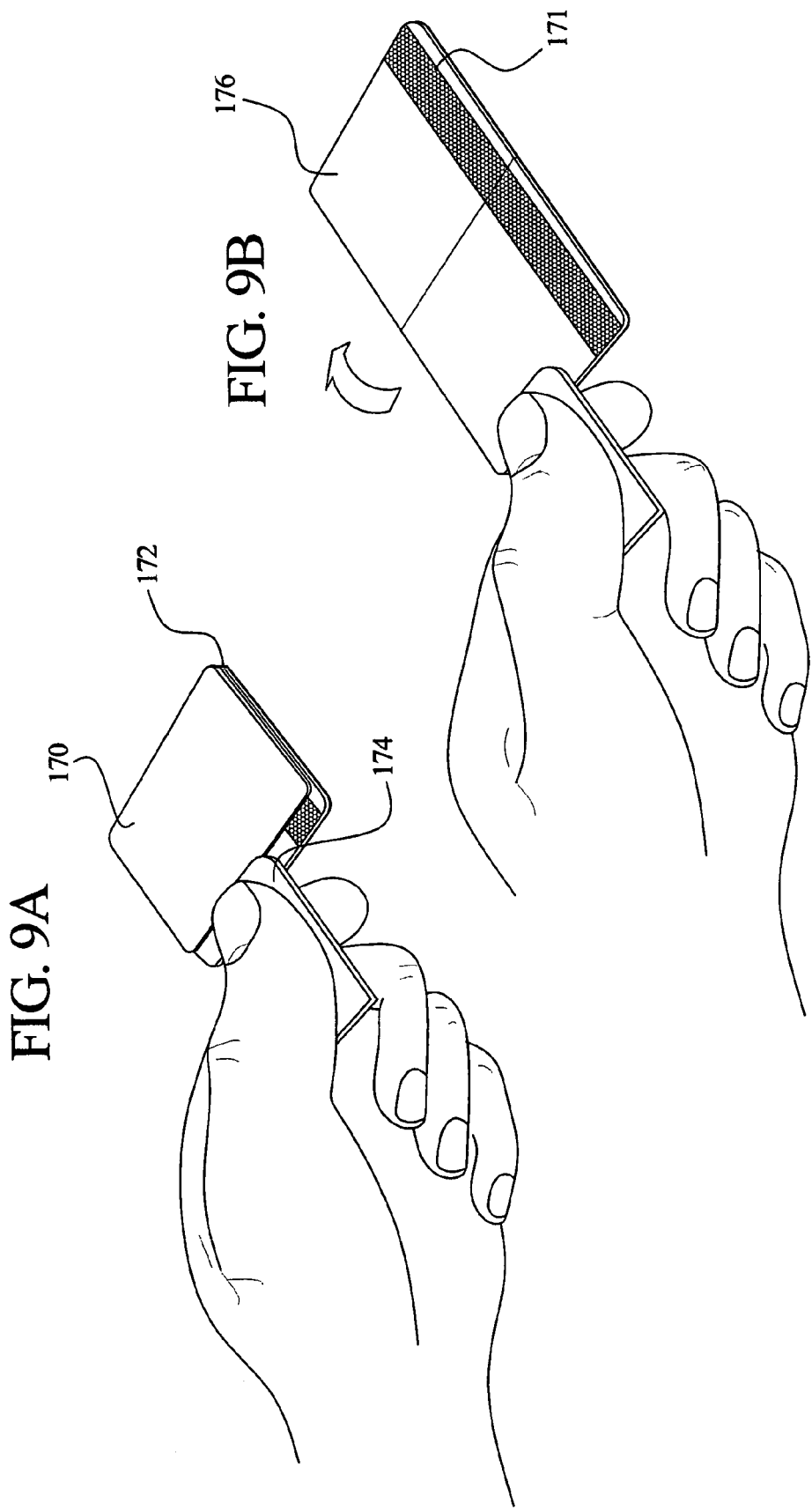

FIG. 13A
FIG. 13B
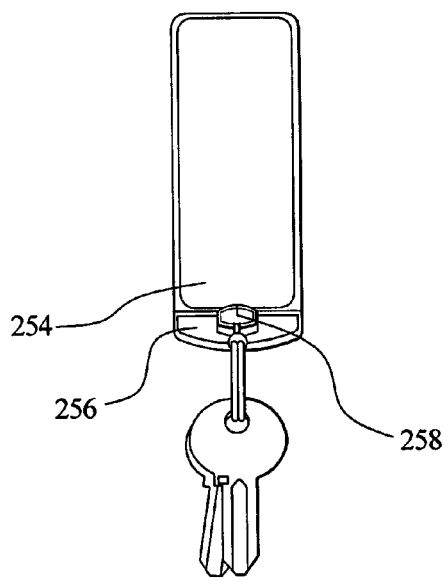
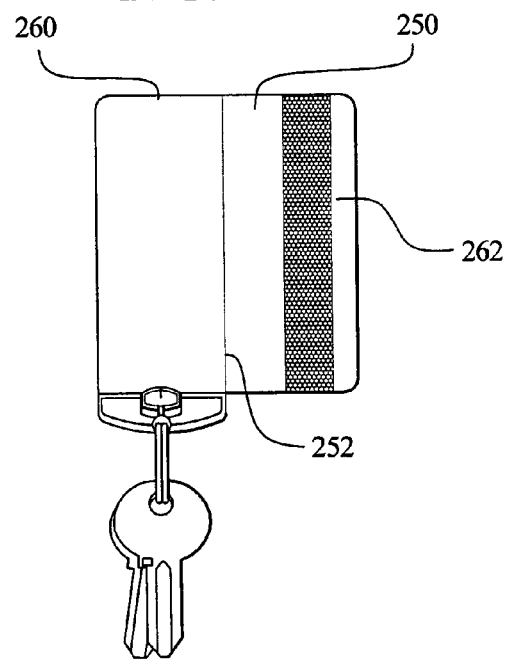
FIG. 14A
FIG. 14B
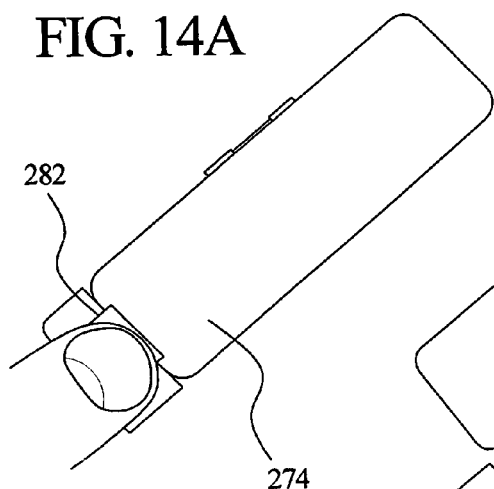
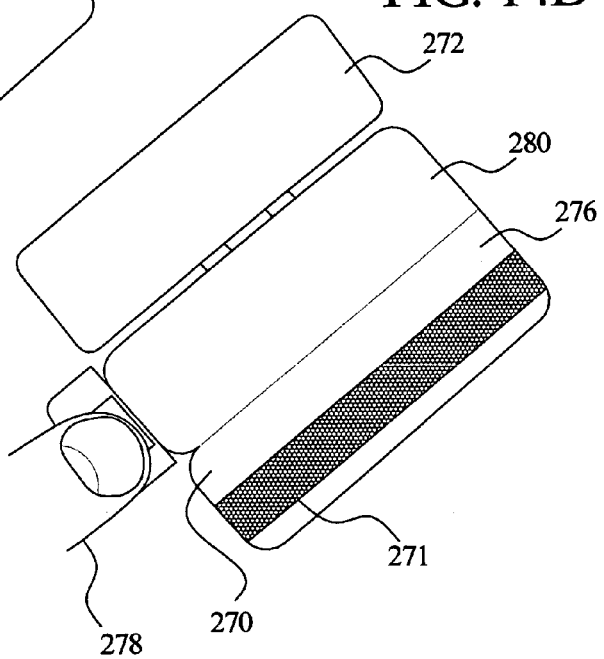

FOLDABLE TRANSACTION CARD

CROSS REFERENCE TO RELATED APPLICATIONS

The present application is a Continuation Application of U.S. patent application Ser. No. 10/436,394, filed May 12, 2003 now U.S. Pat. No. 7,213,764, which further claims the benefit of U.S. Provisional Application No. 60/424,592 filed Nov. 7, 2002, and U.S. Provisional Application No. 60/442,991 filed Jan. 28, 2003.

FIELD OF THE INVENTION

The present invention relates to a transaction card having one or more fold lines therein to provide a compact and easily stored transaction card. Moreover, the present invention relates to a foldable transaction card having one or more holes or apertures therein for holding a keychain, or other device for attaching the transaction card to another item, such as a set of keys, a wallet, or other item.

BACKGROUND

It is, of course, generally known to provide transaction cards for providing a means for purchasing goods or services without the use of paper money or coinage. Specifically, transaction cards may represent credit, whereby a user of the transaction card may present the card in lieu of the paper money or coinage. Alternatively, transaction cards may be debit cards, whereby electronic money, such as money stored in an account, is removed from the account each time that the transaction card is used. In addition, transaction cards may have a certain amount of money, or other valuable commodity, recorded thereon, whereby a user of the transaction card may remove the money directly from the transaction card. For example, retail stores now offer cards that can be purchased for a certain amount of money. That amount, or any other amount, may be represented on the transaction card. When the transaction card is utilized, the amount represented on the card may be reduced until the transaction card represents that it cannot be utilized anymore, or that the card represents that it is not worth any more money. In addition, other values besides currency may be represented on the transaction card, such as equivalent goods or services.

Transaction cards typically have a magnetic stripe provided, or some other means, for storing information relating to the transaction card, such as, a security code, and information relating to an account or an amount of money that the transaction card may represent. For example, if the transaction card is a credit card, the information contained on the magnetic stripe may relate to an account whereby use of the credit card may alert the account to release funds for the purchase of goods or services. Of course, the magnetic stripe or other means may further contain any other information to allow the transaction card to be utilized. The transaction card is typically fed into or through a reader that reads the information contained on the magnetic stripe to extract the information as needed when the transaction card is being used.

The transaction card may further contain other features that allow for the secure and efficient use of the transaction card, such as holographic security devices, signature panels, pictures of the owner of the transaction card, embedded microchips, or any other item or element that may be useful for the transaction card.

Transaction cards are typically sized according to standards set by the International Organization for Standardization (ISO). This means that most transaction cards being utilized are of the same size and dimensions, typically about 2.5 inches by about 3 inches in a generally rectangular configuration. However, a transaction card having dimensions according to this standard typically is too big to be stored in a convenient way except loose in a pocket, wallet or purse, or contained within a slot in a wallet or purse allowing the snug fit of the transaction card. Transaction cards are, therefore, highly susceptible to being lost or stolen. Other shapes and sizes would allow the transaction cards to be attached to, secured with, or otherwise stored with other items, such as key chains, for example.

A need exists, therefore, for a transaction card having the capability of being attached to securing means or stored in smaller areas than are currently allowed. For example, a need exists for a transaction card that may be clipped or otherwise attached to a keychain, or some other means for securing the transaction card to another item, yet is small enough to remain inconspicuous and compact, but handy. Further, a need exists for a transaction card having the above-noted advantages and further that maintains the information or other features typically disposed on or within a transaction card.

SUMMARY

The present invention relates to a transaction card having one or more fold lines therein to provide a compact and easily stored transaction card. Moreover, the present invention relates to a foldable transaction card having one or more holes or apertures therein for holding a keychain, or other device for attaching the transaction card to another item, such as a set of keys, a wallet, or other item.

It is, therefore, an advantage to provide a transaction card that is foldable so as to be highly compact so that the transaction card may be stored in small areas. Further, it is an advantage of the present invention to provide a transaction card that may be attached to another item via a securing means, such as a ring or chain.

It is particularly an advantage to provide a transaction card that can be attached to a keychain, yet still remain small and compact. Therefore, an advantage of the present invention is that the transaction card may be small enough to be inconspicuous and be secured to another item thereby minimizing the chance that the transaction card will be misplaced, lost or stolen.

It is still yet a further advantage to provide a transaction card that is foldable that comprises other features typically found on or within a transaction card, such as security devices, embedded microchips, or magnetic stripes having information stored thereon or the like.

Additional features and advantages of the presently preferred examples are described in, and will be apparent from, the detailed description of the presently preferred embodiments and from the drawings.

BRIEF DESCRIPTION OF THE DRAWINGS

FIGS. 4A and 4B illustrate a transaction card foldable longitudinally and parallel to the long edges of the transaction card.

FIGS. 5A and 5B illustrate a smaller-sized transaction card that is transversely foldable.

FIGS. 9A and 9B illustrate a foldable transaction card having a spring-loaded clip for holding said foldable transaction card in a folded state.

FIGS. 13A and 13B illustrate a foldable transaction card that is longitudinally foldable, the transaction card having a spring-loaded clip and a holder for a ring or keychain.

FIGS. 14A and 14B illustrate a longitudinally foldable transaction card disposed within a protective cover.

DETAILED DESCRIPTION

The present invention relates to a transaction card having one or more folds therein to provide a compact and easily stored transaction card. Moreover, the present invention relates to a foldable transaction card having one or more holes or apertures therein for holding a keychain, or other device for attaching the transaction card to another item, such as a set of keys, a wallet, or other item.

Figure 1A:
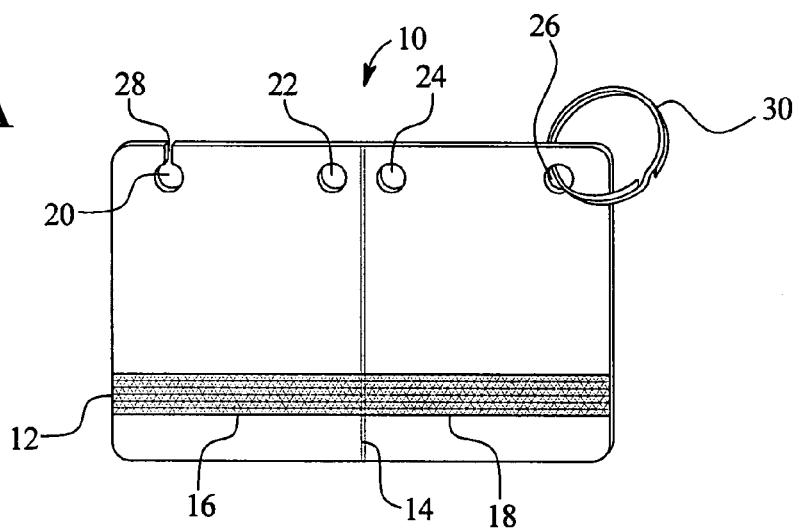
FIGS. 1A-1C illustrate a transaction card that is transversely foldable and having apertures for securing a ring or a keychain thereto.
Figure 1B:
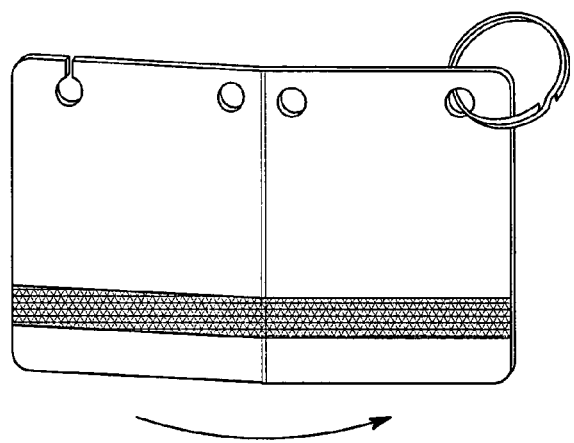
Figure 1C:
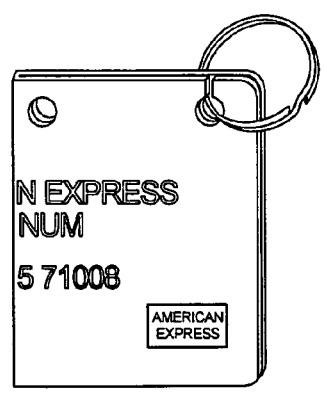

Referring now to FIGS. 1A-1C, a first example of the present invention is illustrated. FIGS. 1A-1C illustrates a foldable transaction card 10, shown generically as merely having a magnetic stripe 12. Other features not shown, however, may be provided on the transaction card, such as a signature panel, an embedded microchip, a holographic image, or the like. These features may allow the transaction card to function more easily, efficiently, and/or more securely.

Of course, the transaction card 10 typically comprises a plurality of layers (not shown) to form the rigid card. For example, transaction cards typically include inner layers of a polymeric material to provide the transaction card with thickness and bulk. In addition, outer layers are typically provided comprising a polymeric material that protects the inner layers of the transaction card. In addition, the polymeric material of the outer layers may provide rigidity and further may add to the thickness of the transaction card. The transaction card 10, and the other transaction cards described herein, may be made from any generally known material typically used for transaction cards, such as, for example, polyvinylchloride (PVC) and polypropylene (PP). Typically, transaction cards such as the ones described herein have multiple layers of polymeric materials. For example, a typical card may have one or more internal layers of PVC or PP, and outer layers of polyethylene terephthalate (PET) for rigidity and strength.

Transaction cards may further be transparent, as described in U.S. patent application Ser. No. 10/092,681, filed Mar. 7, 2002, which is a continuation-in-part application of U.S. patent application Ser. No. 10/062,106, filed Jan. 31, 2001, which is a continuation-in-part application of U.S. patent application Ser. No. 09/653,837, filed Sep. 1, 2000 and further claims the benefit of U.S. Provisional Application No. 60/153,112, filed Sep. 7, 1999; U.S. Provisional Application No. 60/160,519, filed Oct. 20, 1999; U.S. Provisional Application No. 60/167,405, filed Nov. 24, 1999; U.S. Provisional Patent Application No. 60/171,689, filed Dec. 21, 1999, each of which is expressly incorporated herein in its entirety. The transparent transaction card may contain a plurality of optically recognizable layers or an infrared-blocking ink to allow the transparent transaction cards to be recognized by a card reader.

The transaction card 10 has a fold line 14 that allows the transaction card 10 to be folded, as illustrated in FIGS. 1B and 1C. The fold line may be made by scoring the outer layers of the transaction card 10 via a scoring means, such as a blade or a laser beam and allowing the inner layers to act as a hinge when the transaction card is folded. Alternatively, the transaction card may include a reinforcing material at the location of the fold line 14 so that the fold line 14 does not pull apart, or otherwise destroy the transaction card 10 when folded. Of course, other materials may be utilized in the transaction card 10 to act as a hinge at the fold line 14, and the invention should not be limited in this regard.

The magnetic stripe 12 may contain a material for storing information that may be read by a magnetic reader. Typically, the magnetic stripe 12 contains a series of digits that the magnetic card reader can utilize to obtain information about the account that the transaction card is associated with, or otherwise to obtain information relating to the amount of money or other equivalent good or service represented by the transaction card 10. The magnetic stripe 12 of the present embodiment is, necessarily, split into two halves because of the fold line 14 that bisects the magnetic stripe 12. Therefore, the information contained on the magnetic stripe 12 must be readable by a magnetic card reader at a point-of-sale machine that accounts for the fold line 14. Typically, this means that some or all of the information should be contained on a first section 16 of the magnetic stripe 12, and the rest or a duplicate of the information should be contained on a second section 18 of the magnetic stripe 12. Therefore, the information contained on the magnetic stripe 12 may be readable by the magnetic stripe reader. Alternatively, the magnetic stripe may be provided in parallel with one of the short ends of the transaction card, as illustrated in FIGS. 2A-2C, below.

Disposed in the transaction card 10 may be a plurality of apertures 20, 22, 24 and 26 that may be utilized to attach the transaction card 10 to a securing means, such as a ring 28, as illustrated in FIGS. 1A-1C. Of course, any other securing means, such as a chain or string, for example, may be utilized and the invention should not be limited as herein described. The securing means can be provided in any of the apertures as needed. Aperture 20 may include a channel 28 that allows a securing means to be slipped into the aperture 20. For example, as illustrated in FIG. 1C, the ring 28 may be provided within the aperture 26, but may also fit within the aperture 20 through the channel 28 so that the transaction card may stay folded. Alternatively, the ring 28 may be provided through one or both of the apertures 22, 24. If the ring 28 is provided through both of the apertures 22 and 24, the ring 28 may be configured in such a way as to allow the transaction card 10 to be unfolded when used.

Figure 2A:
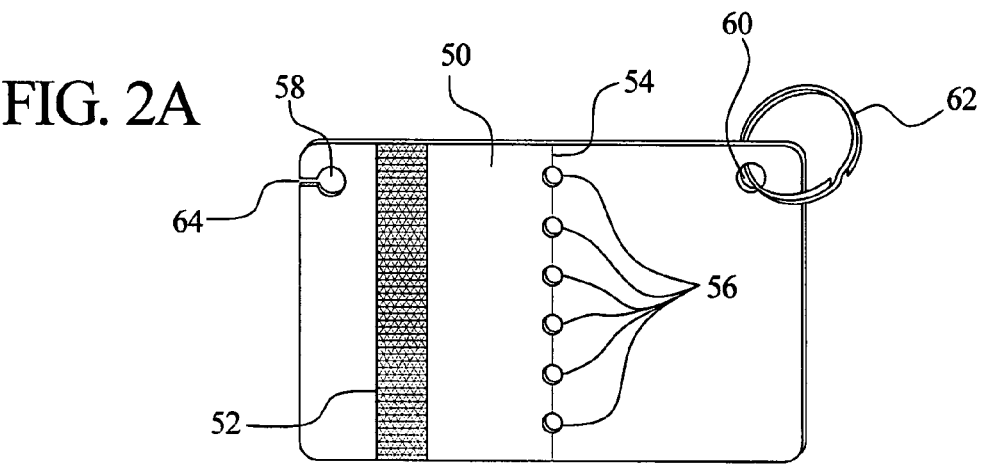
FIGS. 2A-2C illustrate another transaction card that is transversely foldable.
Figure 2B:
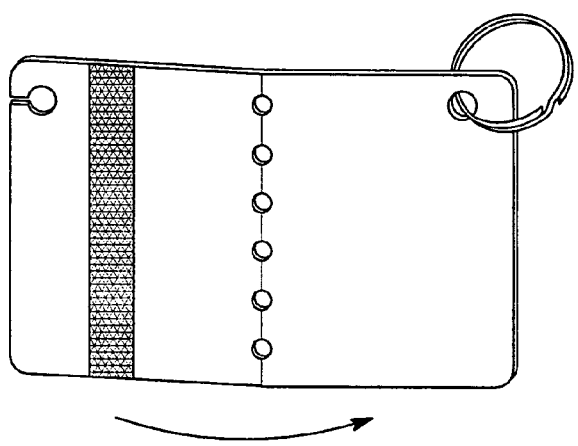
Figure 2C:
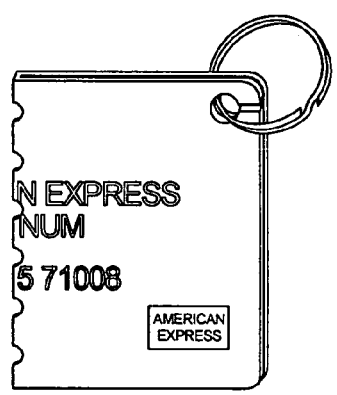

FIGS. 2A-2C illustrate an alternate example of the present invention of a foldable transaction card 50 having a magnetic stripe 52 that is parallel to a short side of the transaction card 50. The transaction card 50 may be very similar to the transaction card 10, as described above and may have a fold line 54 that divides the transaction card into two halves. Of course, more than one fold line may be provided in the transaction card 50 for dividing the card into more than just two halves, as described below. The transaction card may further have a plurality of holes 56 provided along the fold line 54 thereby giving the transaction card 50 a distinctive appearance, and further aiding in allowing the transaction card 50 to be folded along the fold line 54.

The transaction card 50 may further have apertures 58, 60 for a securing means, such as a ring 62, or other securing means such as a chain or a string, for example. The ring 62 may be provided through the aperture 60, and may further be clipped into the aperture 58 after the transaction card 50 has been folded, as illustrated in FIG. 2C. To allow the ring 62 to be clipped into the aperture 58, the aperture 58 may include a channel 64.

Figure 3A:
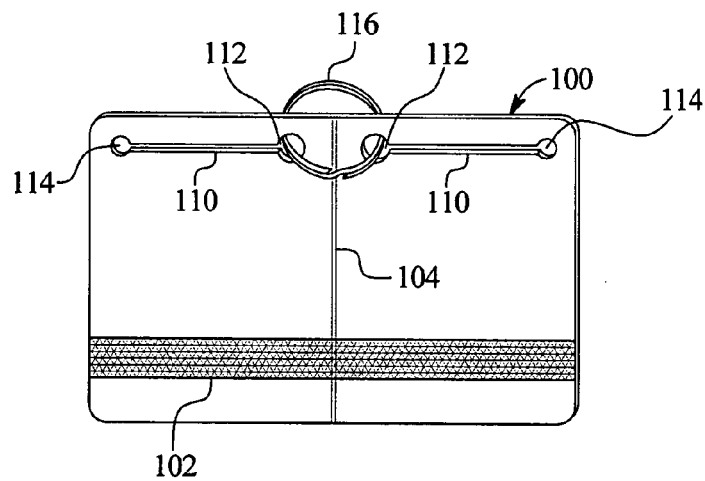
FIGS. 3A-3D illustrate another transaction card that is transversely foldable having an aperture and slot for a ring or keychain.
Figure 3B:
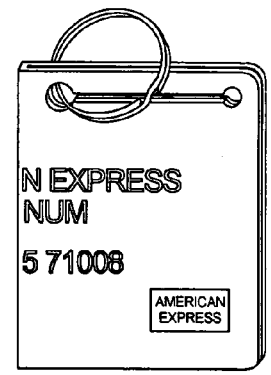
Figure 3C:
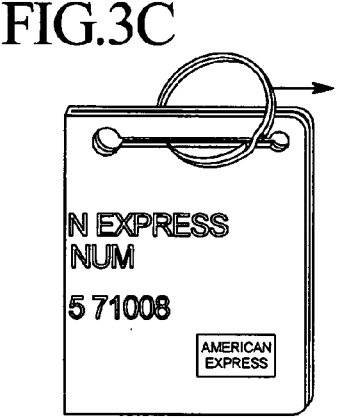
Figure 3D:
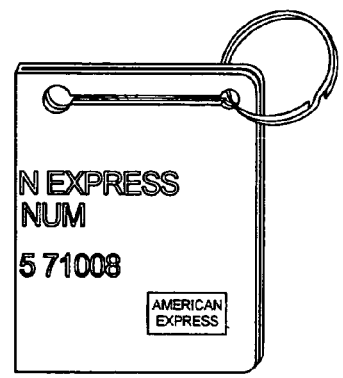

FIGS. 3A-3D illustrate a still further example of the present invention of a transaction card 100 having similar features to the transaction card 10 of FIGS. 1A-1C. For example, the transaction card 100 includes a magnetic stripe 102 and a fold line 104 allowing the transaction card 100 to be folded, thereby making the transaction card smaller and more compact. Each half of the transaction card 100 may include a slit 110 connecting two apertures 112 and 114. A ring 116, or other securing means, may be provided through the apertures 112 such that, when folded, as illustrated in FIGS. 3B-3D, the ring 116 may translate through the slits 110 to rest in the aperture 114, thereby keeping the two halves of the transaction card 100 together when folded. If the transaction card 100 is to be opened, the ring 116 is merely translated back to the apertures 112 and the transaction card 100 is unfolded.

FIGS. 4A-4B illustrate another example of a transaction card 120 having a magnetic stripe 121 and a fold line 122 disposed longitudinally through the center of the transaction card 120 such that when the transaction card 120 is folded along said fold line 122, a folded transaction card 124 is created, as shown in FIG. 4B, which thereby protects the magnetic stripe 121. It should be noted that a smaller-sized transaction card may be created even if the fold line is not disposed longitudinally through the center of the transaction card 120.

FIGS. 5A-5B illustrate another example of a miniature transaction card 130 having a magnetic stripe 131 and a fold line 132 disposed transversely through the center of the card 130 such that when the miniature transaction card 130 is folded along said fold line 132, a folded miniature transaction card 134 is created, as illustrated in FIG. 5B. The size of the miniature transaction card 130 may be smaller than a normally-sized transaction card. It should be noted that a smaller-sized transaction card may be created even if the fold line is not disposed transversely through the center of the transaction card 130.

Figure 6A:
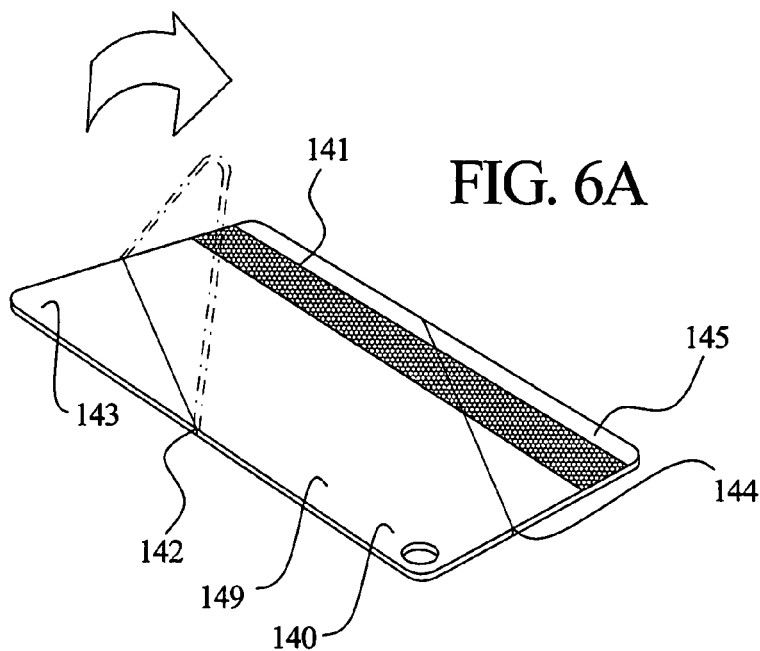
FIGS. 6A-6C illustrate a transaction card having fold lines disposed at angles to the edges of the transaction card but can be unfolded to be utilized within a point-of-sale machine.
Figure 6B:
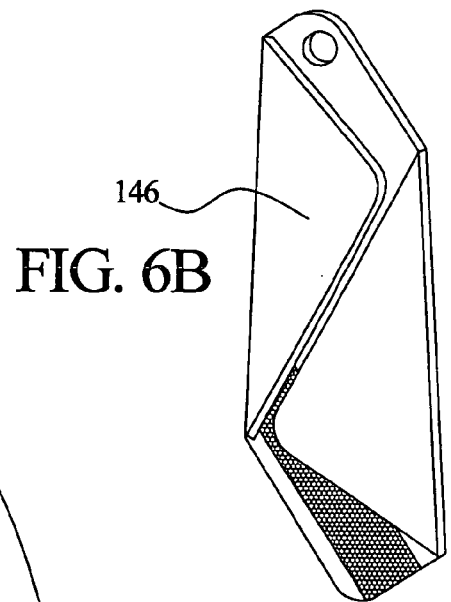
Figure 6C:
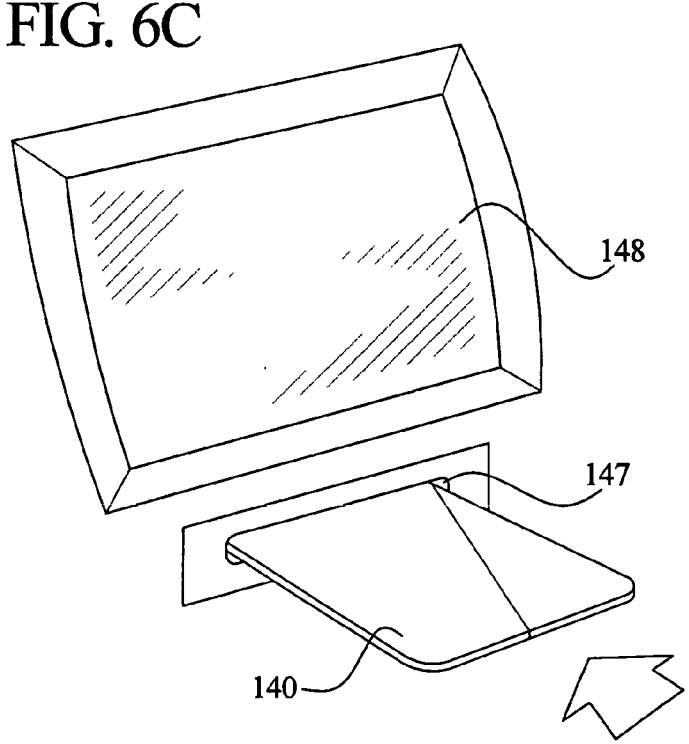

FIGS. 6A-6C illustrate another example of a foldable transaction card 140 having a magnetic stripe 141 and two fold lines 142, 144 disposed parallel to each other but diagonal relative to the edges of the transaction card 140. The fold lines 142, 144 allow the transaction card 140 to be folded such that flaps 143, 145 fold over section 149 to form a folded transaction card 146, as illustrated in FIG. 6B, which substantially protects the magnetic stripe 141. When unfolded, the transaction card 140 may be inserted into a slot 147 of an automatic teller machine (ATM) without difficulty, as illustrated in FIG. 6C.

Figure 7A:
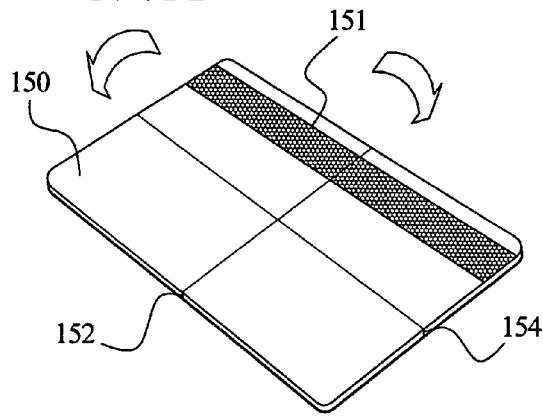
FIGS. 7A and 7B illustrate a transaction card foldable once in a longitudinal direction, and once in a transverse direction.
Figure 7B:
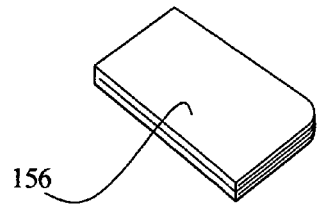

FIGS. 7A-7B illustrate another example of a foldable transaction card 150 having a magnetic stripe 151 and two fold lines 152, 154 that are disposed both longitudinally and transversely across the transaction card 150, thereby being disposed perpendicular to each other. The fold lines 152, 154 allow the transaction card 150 to be folded twice to form a folded transaction card 156 that protects the magnetic stripe 151, as illustrated in FIG. 7B.

Figure 8A:
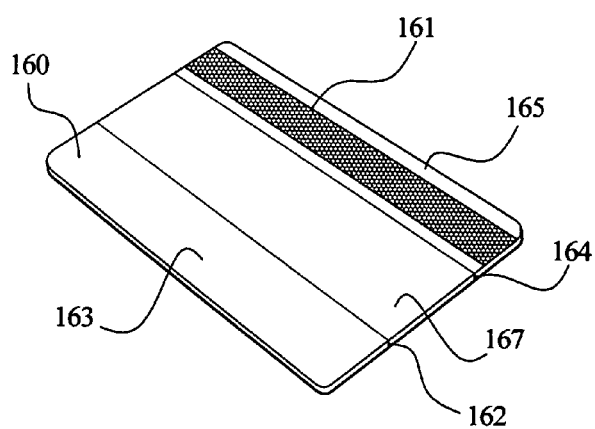
FIGS. 8A and 8B illustrate a transaction card having two longitudinal fold lines disposed parallel to edges of said transaction card thereby forming a foldable transaction card having three sections.
Figure 8B:
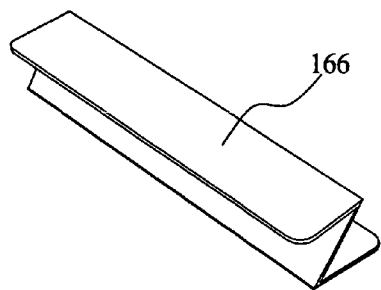

FIGS. 8A and 8B illustrate an alternate example of the present invention of a foldable transaction card 160 having a magnetic stripe 161 and two fold lines 162, 164 that are disposed longitudinally, but subdivide the transaction card 160 into three sections: a first section 163, a second section 165 and a third section 167. Alternatively, the transaction card 160 may have two fold lines that are disposed transversely across the transaction card but also subdivide the transaction into thirds (not shown). The fold lines 162, 164 allow the transaction card 160 to be folded twice to form a folded transaction card 166 that is small and compact and further that protects the magnetic stripe. The folded transaction card 166 may be folded as shown in FIG. 8B, which shows the transaction card 160 such that the outer sections 163, 165 of the transaction card 160 are folded inwardly on opposite sides of the middle of the three sections 167 in a "Z" configuration. Alternatively, the transaction card 160 may be folded such that the outer sections 163, 165 of the transaction card 160 may be folded inwardly on the same side of the middle section 167 (not shown). Of course, the fold lines 162, 164 may not subdivide the transaction card into thirds, but subdivide the transaction card into three unequal sections. In addition, additional fold lines may be provided such that the transaction card may be subdivided into four or more equal or unequal portions.

In an alternate example of the present invention, a transaction card, similar to the cards described above with respect to FIGS. 1A-8, may have a fold line disposed between at least first and second sections. Further, the transaction card may have a snap, button or other mechanism (collectively a "snap") which may hold the folded transaction card in a first engaged or locked position (collectively, the "engaged position"). The transaction card may not be usably accessible when the snap is in the engaged position. When the snap is actuated, the snap disengages or unlocks (collectively, the "dis-engaged position") and the second section of the convenience card unfolds into an "unfolded position". The fold line may be disposed either longitudinally or transversely across the face of the transaction card.

In the unfolded position, the transaction card becomes a full-sized financial transaction card and/or a card that may be used as a form of payment to conduct transactions and in standard financial transaction card readers, such as those at retail point-of-sale locations or ATM (cash) machines. In a preferred embodiment, when the second section is folded and is otherwise inaccessible, the external surface area of the card is approximately half as compared to when the second section is usably accessible in the unfolded position. In an alternate embodiment, the transaction card can be refolded by folding the first and second sections in relation to one another and re-engaging the snap to keep the card folded. To allow folding, the first and second sections may be coupled by a flexible material or hinge. In an alternative embodiment, the card may have a plurality of folding sections.

FIGS. 9A and 9B illustrate an alternate example of a foldable transaction card 170 having two sections 176, 178 separated by a fold line 172. The transaction card 170 may be maintained in a folded stated via a spring-loaded clip. By releasing the spring-loaded clip 174, the folded transaction card 170 may unfold along fold line 172 to form an unfolded transaction card 179 having a visible and usable magnetic stripe 171. The spring-loaded clip 174 may be disposed on a side 177 of the section 176 that forms a side of the transaction card 170 when in the unfolded state.

Figure 10:
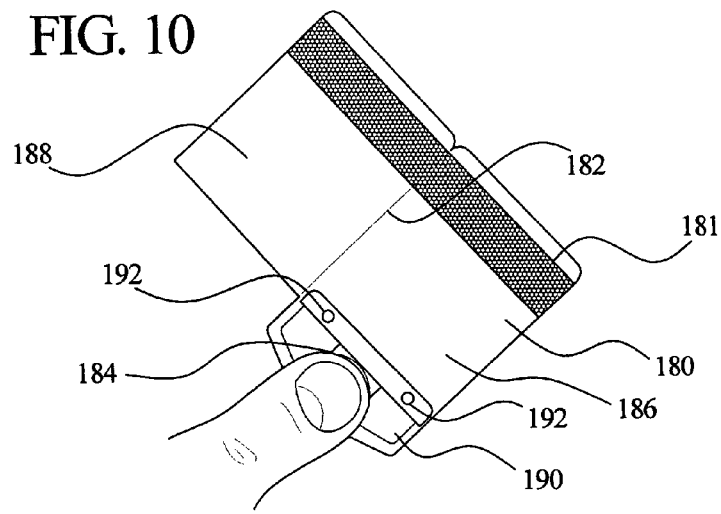
FIG. 10 illustrates a foldable transaction card having a spring-loaded clip and a holder for attaching to a ring or keychain.

Moreover, FIG. 10 illustrates a foldable transaction card 180 having two sections 186, 188 separated by a fold line 182. The transaction card 180 may be maintained in the folded stated via a spring-loaded clip 184. The transaction card 180 may be similar to the transaction card 170, as illustrated in FIGS. 9A and 9B, except the clip 184 may be disposed on a side 187 of the section 186 that forms the bottom of the transaction card (opposite the magnetic stripe 181). The spring-loaded clip 184 may be interconnected with a holder 190 having the spring-loaded clip 184 disposed thereon. The transaction card 180 may be interconnected with the holder 190 via pins 192, or via any other means that holds the transaction card 180 to the holder 190. The transaction card 180 may be removable from the holder 190 so that the transaction card 180 may be useable in any point-of-service machine, such as a payment machine or an automatic teller machine (ATM).

Alternatively, the transaction card 180 may be permanently attached to the holder 190. The holder may further be attachable to a key chain, or the like, such that keys or the like may be removably attached to the holder 190, thereby minimizing the chances that the transaction card 180 may be misplaced. In addition, the transaction card 180 may be easily accessible if attached to a keychain or the like.

On external surfaces of the transaction card 180 (on the face of the transaction card opposite the magnetic strip 181) there may be disposed a protective material, such as a metallized surface, or other surface, that protects the transaction card 180 when the transaction card 180 is in the folded state. Specifically, a material such as aluminized polyester may be utilized as a coating or external layer of the transaction card 180. As shown in FIG. 10, the magnetic stripe 181 may be disposed on an inside surface of the foldable transaction card 180 so that when folded, the magnetic stripe 181 is protected.

Figure 11A:
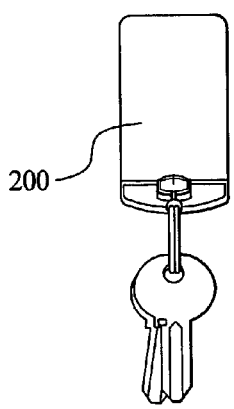
FIGS. 11A and 11B illustrate a transaction card foldable into thirds and having a spring-loaded clip and a holder for attaching to a ring or keychain.
Figure 11B:
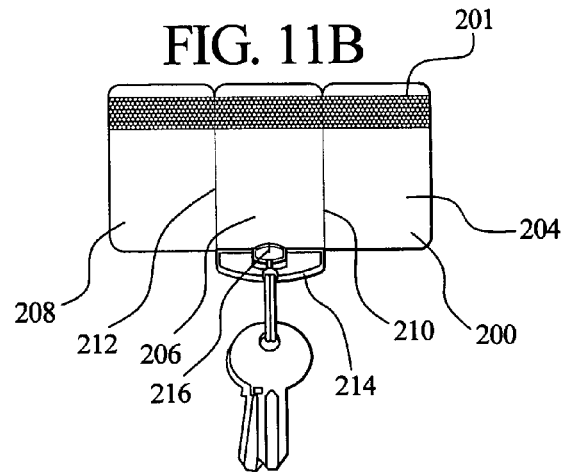

FIGS. 11A and 11B illustrate a still further example of the present invention that is similar to the example shown in FIG. 10. FIGS. 11A and 11B show a transaction card 200 having a magnetic stripe 201 that may have a folded state (as shown in FIG. 11A) or an unfolded state (as shown in FIG. 11B). The transaction card 200 may have three sect 204, 206 and 208 that are separated by fold lines 210, 212. The outer sections 204 and 208 may fold inwardly toward the center section 206 to form the folded transaction card 202, thereby protecting the magnetic stripe 201. In addition, the outside surface of the transaction card 200 (i.e., the surface opposite the magnetic stripe) may be made from a material that protects the transaction card 200, such as a metallized material. For example, the outside layer of the transaction card 200 may be made from aluminized polyester.

A holder 214 may be disposed on the transaction card 200 on the central section 206, such that when folded together to form the folded state, a spring-loaded clip 216 may hold the folded transaction card 200 together. Although the present example is shown with the holder 214 disposed on the central section 206, the holder 214 may be disposed on any of the sections 204, 206 or 208 such that when folded, the holder may hold the folded transaction card in place with the spring-loaded clip 216. When actuated, the spring-loaded clip allows the outer sections 204, 208 to unfold from the central section 206, thereby forming the transaction card 200 in the unfolded state. As with the transaction card 180, as shown in FIG. 10, the transaction card 200 may be detachable from the holder 214 such that the transaction card 200 may be utilized in a point-of-sale machine, such as an automatic teller machine.

In another embodiment, the transaction card has an associated holder, receptacle, pocket, or sleeve (collectively, the "carrier") that can fold in relation with the transaction card and in which the transaction card can be enclosed in whole or in part. The carrier itself may have a snap in an engaged or locked position such that in a first position, a second section of the carrier is folded in relation to a first section of the carrier (the "folded position of the carrier"), such that the transaction card is not usably accessible. When the carrier snap is actuated, the snap disengages or unlocks and the carrier second section unfolds in relation to the carrier first section, making accessible a foldable transaction card that simultaneously unfolds in relation to the carrier. The transaction card may be coupled to the carrier in a manner that allows it to be attached or detached. The carrier, in order to fold, may also have at least first and second sections coupled by a flexible material or hinge.

Figure 12A:
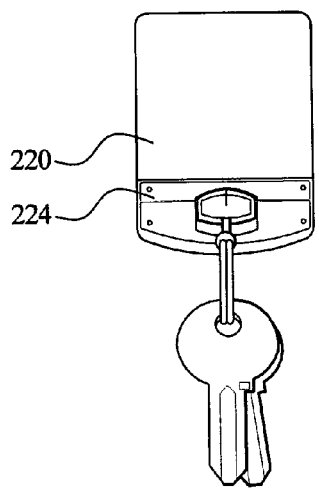
FIGS. 12A and 12B illustrate a foldable transaction card disposed in a foldable carrier, the foldable transaction card further having a spring-loaded clip and a holder for attaching to a ring or keychain.
Figure 12B:
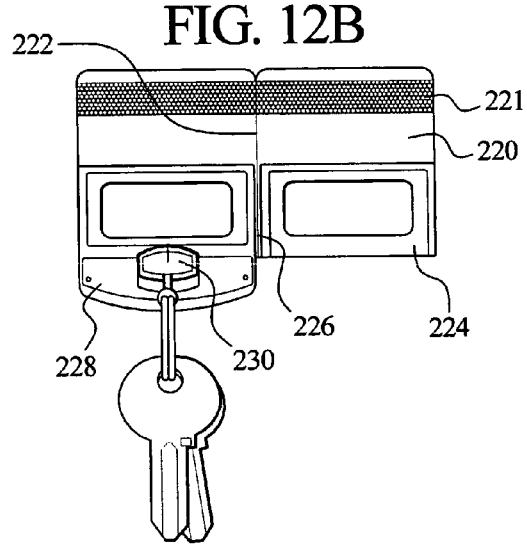

An example of this is shown in FIGS. 12A and 12B, which shows a transaction card 220 having a magnetic stripe 221 that may be in an unfolded state (as shown in FIG. 12B) or a folded state (as shown in FIG. 12A) due to a fold line or hinge 222. The transaction card 220 may be disposed within a carrier 224 that may also have a fold line or hinge 226. Both the transaction card 220 and the carrier 224 may fold via the fold lines 222 and 226, respectively, to allow the transaction card to be disposed in the folded state, as illustrated in FIG. 12A. Further, the transaction card 220, which is disposed within the carrier 224, may be interconnected with a holder 228 having a spring-loaded clip 230 which can hold both the carrier 224 and the transaction card 220 in the folded state. When the transaction card 220 is in the folded state and the clip 230 is actuated, the transaction card 220 and the carrier 224 may be unfolded. When the transaction card 220 and the carrier 224 are folded, the clip may lock the transaction card 220 into the folded state.

Both the transaction card 220 and the carrier 224 may be detachable from the holder 228. Alternatively, the transaction card 220 may only detachable from the carrier 224, thereby allowing the transaction card to be utilized in point-of-sale machines, such as ATMs. Alternatively, the transaction card 220 may be detachable and removable from the carrier 224, which may also be detachable and removable from the holder 228.

Although FIGS. 12A and 12B illustrate that the carrier 224 only covers a portion of the transaction card 220, the carrier 224 may cover more or less of the transaction card 220 than shown. For example, the carrier 224 may cover the entire surface of the transaction card 220 such that the transaction card 220 must be fully removable from the carrier 224 when utilized.

Alternatively, transaction card may be both foldable within a carrier that is also foldable and slidable from the carrier, such that the carrier and the transaction card, when slid from the carrier, form a full-sized transaction card that may be utilized in point-of-sale machines. For example, a spring-loaded clip may be actuated thereby allowing a carrier and transaction card to unfold. Once unfolded, a slot may be exposed that allows a user of the transaction card to push the transaction card out of the carrier, thereby exposing the magnetic stripe. Alternatively, a button may be exposed whereupon actuating the button allows the transaction card to be slid from the carrier. However, the transaction card may not be fully removable from the carrier, but may merely be slidable such that a full-sized transaction card is made from the smaller-sized transaction card and the carrier.

The transaction card 220 may have a metallized surface such that the surface protects the transaction card 220. For example, the surface of the transaction card may be made from aluminized polyester. Alternatively, the carrier 224 may be metallized, or made from some other protective material, to protect the transaction card 220. When folded, the transaction card 220 protects the magnetic stripe 221.

In an alternate example of the present invention, FIGS. 13A and 13B show a foldable transaction card 250 having a magnetic stripe 251 that may be foldable because of a fold line 252. The transaction card 250 may be disposed within a case 254 that is interconnected with a holder 256 having a spring-loaded clip 258. The case 254 may be formed like a clamshell, in that the transaction card 250 form the two halves of the case and the magnetic stripe 251 is exposed when the case 254 is opened. The bottom portion of the case 260 may have a portion of the transaction card 250 affixed thereto, or may be formed simply as a protective layer on the transaction card 250, such as aluminized polyester or the like. The top portion 262 of the case 254 may also have a portion of the transaction card 250 affixed thereto, or may also be formed simply as a protective layer on the transaction card 250, such as aluminized polyester or the like. The spring-loaded clip 258 may hold the case 254 together when the case is in the folded state.

FIGS. 14A and 14B show an alternate example of a transaction card 270 having a magnetic stripe 271 that is similar to the transaction card 250, described above in relation to FIGS. 13A and 13B, except the transaction card 270 may have a protective cover 272 that is hinged to a bottom portion 280 of the a 274. The protective cover 272 may be made from metal, plastic or other material that will protect the foldable transaction card 270 contained therein. Specifically, the transaction card 270 may have a first section 276 having the magnetic stripe 271 and a second section 278. The second section 278 may form the bottom portion 280 of the case 274. The second section 278 forming the bottom portion 280 may have a metallized surface, or other protective surface, to protect the second section 278, and the entire transaction card 270 when the transaction card 270 is folded and the protective cover 272 is folded over the bottom portion 280. Alternatively, the second section 278 may be removably attached to the bottom portion 280 by holding means, such as pins or the like, such that the second section 278 may be removed from the bottom portion 280. This allows the transaction card 270 to be removed from the bottom portion 280 so that the transaction card 270 may be utilized in a point-of-sale machine, such as an ATM.

When folded together, the transaction card 270 may be enclosed within the protective cover 272 and the bottom portion 280, as shown in FIG. 14A. When utilized, an individual may actuate a spring-loaded clip 282 that allows the protective cover 272 to open, thereby exposing the transaction card 270 therein. The first section 276 may then be unfolded, thereby exposing the magnetic stripe 271 to be utilized at a point-of-sale machine.

The present invention has been described above with reference to exemplary embodiments. However, those skilled in the art having read this disclosure will recognize that changes and modifications may be made to the exemplary embodiments without departing from the scope of the present invention.

We claim:

1. A foldable transaction card system comprising:
   a transaction card; and,
   at least one fold line for folding said transaction card wherein said transaction card comprises a folded state and an unfolded state and wherein said transaction card is configured to facilitate a purchase transaction at a point of sale when said transaction card is in said folded state.

2. The system of claim 1 further comprising: at least one aperture in the transaction card for holding a securing means to the transaction card.

3. The system of claim 2 wherein said securing means is a ring.

4. The system of claim 3, wherein said transaction card is configured such that said ring extends through two portions of said transaction card.

5. The system of claim 1 further comprising: a track disposed in said transaction card for holding said securing means.

6. The system of claim 1 wherein said electronic storage means is a microchip.

7. The system of claim 1, wherein said transaction card further comprises a magnetic stripe.

8. The system of claim 7, wherein said transaction card is configured such that said magnetic stripe is configured to be swiped through a card reader.

9. The system of claim 1, wherein said first fold line is asymmetrically disposed on said transaction card.

10. The system of claim 1, wherein when said transaction card is in said folded state, said transaction card further comprises first indicia on a first surface and second indicia on a second surface.

11. A foldable transaction card system comprising:
    a transaction card having at least one fold line for folding said transaction card;
    wherein said transaction card comprises a folded state and an unfolded state;
    wherein said transaction card is configured to facilitate a purchase transaction at a point of sale when said transaction card is in said folded state; and
    wherein when said transaction card is in said folded state, said transaction card has a length which is less than standard length.

12. The system of claim 11, further comprising:
    a ring; and
    wherein said transaction card further comprises at least one aperture in said transaction card for holding said ring to said transaction card, wherein said transaction card is configured such that said ring extends through two portions of said transaction card when said transaction card is in said folded state.

13. The system of claim 11, wherein when said transaction card is in said folded state, said transaction card has a width which is less than standard width.

14. The system of claim 11, wherein said transaction card contains a magnetic stripe.

15. The system of claim 14, wherein said transaction card is configured such that said magnetic stripe is configured to be swiped through a card reader.

16. The system of claim 14, further comprising:
    a ring; and
    at least one aperture in said transaction card for holding said ring to said transaction card.

17. The transaction card of claim 16, wherein said transaction card is configured such that said magnetic stripe is able to be swiped through a card reader.

18. The system of claim 16, wherein said transaction card is configured such that said ring extends through two portions of said transaction card when said transaction card is in said folded state.

19. The system of claim 16, wherein said transaction card is configured such that said magnetic stripe is able to be swiped through a card reader while said ring extends through two portions of said transaction card.

20. A foldable transaction card system comprising:
- a ring;
- a transaction card;
- at least one fold line for folding the transaction card;
- at least one aperture in said transaction card for holding said ring to said transaction card,
- wherein said transaction card comprises a folded state and an unfolded state;
- wherein said transaction card is configured to facilitate a purchase transaction at a point of sale when said transaction card is in said folded state; and
- wherein said transaction card is configured such that said ring extends through two portions of said transaction card when said transaction card is in said folded state.

21. The system of claim 20, wherein said transaction card contains a magnetic stripe.

22. The system of claim 21, wherein said transaction card is configured such that said magnetic stripe is able to be swiped though a card reader.

23. The system of claim 20, wherein when said transaction card is in said folded state, said transaction card has less than at least one of standard length and standard length.

* * * * *

UNITED STATES PATENT AND TRADEMARK OFFICE
CERTIFICATE OF CORRECTION

PATENT NO. : 7,398,931 B2 Page 1 of 1
APPLICATION NO. : 11/714625
DATED : July 15, 2008
INVENTOR(S) : Lasch et al.

It is certified that error appears in the above-identified patent and that said Letters Patent is hereby corrected as shown below:

Col. 10 Line 65-66 please correct Claim 17 to read as follows:

17. The system of claim 16, wherein said transaction card is configured such that said magnetic stripe is able to be swiped through a card reader.

Signed and Sealed this

Tenth Day of March, 2009

JOHN DOLL
*Acting Director of the United States Patent and Trademark Office*